United States Patent
Zhao et al.

(10) Patent No.: US 11,706,411 B2
(45) Date of Patent: Jul. 18, 2023

(54) CONTENT ADAPTIVE SEGMENTED PREDICTION

(71) Applicant: TENCENT AMERICA LLC, Palo Alto, CA (US)

(72) Inventors: Xin Zhao, Santa Clara, CA (US); Xiaozhong Xu, State College, PA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/332,227

(22) Filed: May 27, 2021

(65) Prior Publication Data

US 2022/0070449 A1 Mar. 3, 2022

Related U.S. Application Data

(60) Provisional application No. 63/073,629, filed on Sep. 2, 2020.

(51) Int. Cl.
*H04N 19/11* (2014.01)
*H04N 19/176* (2014.01)
*H04N 19/593* (2014.01)

(52) U.S. Cl.
CPC .......... *H04N 19/11* (2014.11); *H04N 19/176* (2014.11); *H04N 19/593* (2014.11)

(58) Field of Classification Search
CPC .... H04N 19/11; H04N 19/119; H04N 19/159; H04N 19/76; H04N 19/593
See application file for complete search history.

(56) References Cited

U.S. PATENT DOCUMENTS

| 10,542,253 | B2 | 1/2020 | Liu et al. | |
|---|---|---|---|---|
| 2014/0050264 | A1* | 2/2014 | He | H04N 19/174 |
| | | | | 375/240.12 |
| 2019/0182481 | A1* | 6/2019 | Lee | H04N 19/44 |

(Continued)

FOREIGN PATENT DOCUMENTS

| EP | 2081388 A1 | 7/2009 |
|---|---|---|
| TW | 201424388 A | 6/2014 |

OTHER PUBLICATIONS

Joshi et al., "Overview of the Emerging HEVC Screen Content Coding Extension", Mitsubishi Electric Research Laboratories, Sep. 2015, [retrieved Aug. 2, 2021]. Retrieved from the Internet: <URL: https://citeseerx.ist.psu.edu/viewdoc/download?doi=10.1.1.713.8915 &rep=rep1 &type=pdf>; 19 pages total.

(Continued)

*Primary Examiner* — Tsion B Owens
(74) *Attorney, Agent, or Firm* — Sughrue Mion, PLLC

(57) ABSTRACT

Systems and methods for content-adaptive segmented prediction mode are provided. A method includes receiving a coded picture and reconstructing a current block of the coded picture. The reconstructing includes: segmenting samples of the current block into a plurality of segments including a first segment and a second segment; predicting the first segment of the current block of the coded picture by using a first prediction mode; and predicting the second segment of the current block of the coded picture by using a second prediction mode, different from the first prediction mode.

18 Claims, 19 Drawing Sheets

(56) References Cited

U.S. PATENT DOCUMENTS

2022/0141489 A1\* 5/2022 Lee .................... H04N 19/182
                                                          348/43
2022/0295077 A1\* 9/2022 Zhang ................. H04N 19/503

OTHER PUBLICATIONS

International Search Report dated Sep. 30, 2021, issued by the International Searching Authority in application No. PCT/US21/37585.
Written Opinion dated Sep. 30, 2021, issued by the International Searching Authority in application No. PCT/US21/37585.
Yingbin Wang, et al., "Intra Block Copy in AVS3 Video Coding Standard", IEEE, Media Lab, Tencent, 2020, pp. 1-6.
Rajan Joshi, et al., "Screen content coding test model 1 (SCM 1)", Joint Collaborative Team on Video Coding (JCT-VC) of ITU-T SG 16 WP 3 and ISO/IEC JTC 1/SC 29/WG 11, 17th Meeting, Document: JCTVC-Q1014, Mar. 27-Apr. 4, 2014, pp. 1-5, Valencia, ES.
Liang Zhao, et al., "Wide Angular Intra Prediction for Versatile Video Coding", Data Compression Conference (DCC), IEEE, 2019, pp. 53-62.
Zimin Zhang, et al., "Intra Mode Coding in HEVC Standard", MediaTek USA Inc, 2012, 6 pages.
Wei Pu, et al., "Palette Mode Coding in HEVC Screen Content Coding Extension", IEEE Journal on Emerging and Selected Topics in Circuits and Systems, Dec. 2016, pp. 420-432, vol. 6, No. 4.
Shan Liu, et al., "Overview of HEVC extensions on screen content coding", Industrial Technology Advances, The Authors, SIP, 2015, pp. 1-12, vol. 4, No. e10.
Benjamin Bross, et al., "CE3: Multiple reference line intra prediction (Test 1.1.1, 1.1.2, 1.1.3 and 1.1.4)", Fraunhofer HHI, Tencent, Foxconn, ITRI International, Joint Video Experts Team (JVET) of ITU-T SG 16 WP 3 and ISO/IEC JTC 1/SC 29/WG 11, 12th Meeting, Document: JVET-L0283-v2, Oct. 3-12, 2018, 7 pages, Macao, CN.
Benjamin Bross et al., "Versatile Video Coding (Draft 2)", Joint Video Experts Team (JVET) of ITU-T SG 16 WP 3 and ISO/IEC JTC 1/SC 29/WG 11, 11th Meeting, Document: JVET-K1001-v6, Jul. 10-18, 2018, 141 pages, Ljubljana, SI.
Fabien Racape, et al., "CE3-related: Wide-angle intra prediction for non-square blocks", Technicolor, Tencent, Huawei Technologies Co., Ltd, Joint Video Experts Team (JVET) of ITU-T SG 16 WP 3 and ISO/IEC JTC 1/SC 29/WG 11, 11th Meeting, Document: JVET-K0500_r4, Jul. 10-18, 2018, 13 pages, Ljubljana, SI.
Xiang Li, et al., "Description of SDR video coding technology proposal by Tencent", Tencent, Joint Video Experts Team (JVET) of ITU-T SG 16 WP 3 and ISO/IEC JTC 1/SC 29/WG 11, 10th Meeting, Document: JVET-J0029-v1, Apr. 10-20, 2018, pp. 1-34, San Diego, US.
Rajan Joshi, et al., "High Efficiency Video Coding (HEVC) Screen Content Coding: Draft 4", Joint Collaborative Team on Video Coding (JCT-VC) of ITU-T SG 16 WP 3 and ISO/IEC JTC 1/SC 29/WG 11, 21st Meeting, ISO/IEC 23008-2:2015(E), Document: JCTVC-U1005_r1, Jun. 19-26, 2015, 663 pages, Warsaw, PL.
Xiaozhong Xu, et al., "Intra block copy in Versatile Video Coding with Reference Sample Memory Reuse", IEEE, Media Lab, Tencent America, 5 pages, Palo Alto, CA.
Xiaozhong Xu, et al., "Intra Block Copy in HEVC Screen Content Coding Extensions", IEEE Journal on Emerging and Selected Topics in Circuits and Systems, IEEE, 2016, pp. 1-11.
Xiaozhong Yu, et al., "Current Picture Referencing in Versatile Video Coding", IEEE Conference on Multimedia Information Processing and Retrieval (MIPR), IEEE Computer Society, 2019, pp. 26-31.
Xiaozhong Xu, et al., "Block Vector Prediction in Intra Block Copy for HEVC Screen Content Coding", Data Compression Conference, IEEE Computer Society, 2015, pp. 273-282.
Liang Zhao, et al., "Improved Intra Coding Beyond AV1 Using Adaptive Prediction Angles and Reference Lines", Tencent, Palo Alto, CA, USA, 5 pages.
Li et al., "Combining Directional Intra Prediction and Intra Block Copy With Block Partition for HEVC", IEEE International Conference on Image Processing (ICIP), Sep. 25, 2016, pp. 524-528 (5 pages total).
Ballé et al., "Extended Texture Prediction for H.264 Intra Coding", ITU—Telecommunications Standardization Sector, Study Group 16 Question 6, Video Coding Experts Group (VCEG), VCEG-AE11, Marrakech, MA, Jan. 15-16, 2007 (7 pages total).
Zhang et al., "Segmental Prediction for Video Coding", IEEE Transactions on Circuits and Systems for Video Technology, vol. 27, No. 11, Nov. 2017, pp. 2425-2436 (12 pages total).
Extended European Search Report dated Dec. 9, 2022 from the European Patent Office in EP Application No. 21864852.5.
Communication dated Jan. 3, 2023 from the European Patent Office in EP Application No. 21864852.5.

\* cited by examiner

511

512

513

514

515

516

517

518

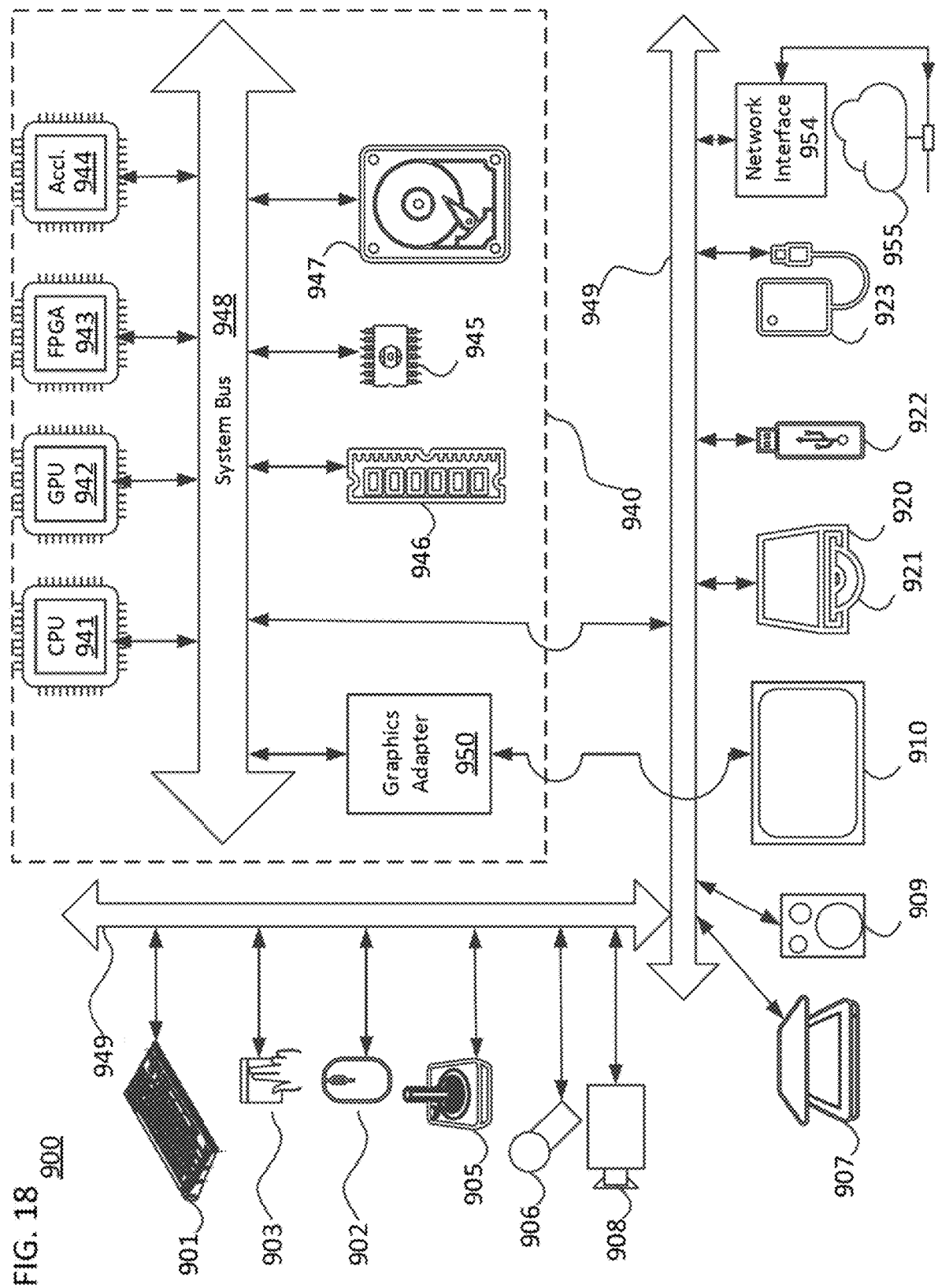

CONTENT ADAPTIVE SEGMENTED PREDICTION

CROSS-REFERENCE TO RELATED APPLICATION

This application claims priority from U.S. Provisional Application No. 63/073,629, filed on Sep. 2, 2020, the disclosure of which is incorporated herein by reference in its entirety.

FIELD

Embodiments of the present disclosure relate to a set of advanced video coding technologies and, more particularly, a content-adaptive segmented prediction mode for image and video compression.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies, and web browser vendors. Many of the components of the AV1 project were sourced from previous research efforts by Alliance members. Individual contributors started experimental technology platforms years before: Xiph's/Mozilla's Daala published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version, version 0.1.0, of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019, "AV1 Bitstream & Decoding Process Specification" was released, which is a validated version 1.0.0 with Errata 1 of the specification. The AV1 bitstream specification includes a reference video codec. The "AV1 Bitstream & Decoding Process Specification" (Version 1.0.0 with Errata 1), The Alliance for Open Media (Jan. 8, 2019), is incorporated herein in its entirety by reference.

The High Efficiency Video Coding (HEVC) standard is developed jointly by the ITU-T Video Coding Experts Group (VCEG) and the ISO/IEC Moving Picture Experts Group (MPEG) standardization organizations. To develop the HEVC standard, these two standardization organizations work together in a partnership known as the Joint Collaborative Team on Video Coding (JCT-VC). The first edition of the HEVC standard was finalized in January 2013, resulting in an aligned text that will be published by both ITU-T and ISO/IEC. After that, additional work was organized to extend the standard to support several additional application scenarios, including extended-range uses with enhanced precision and color format support, scalable video coding, and 3-D/stereo/multiview video coding. In ISO/IEC, the HEVC standard became MPEG-H Part 2 (ISO/IEC 23008-2) and in ITU-T it became ITU-T Recommendation H.265.

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). Since then, they have been studying the potential need for standardization of future video coding technology which could significantly outperform HEVC in compression capability. In October 2017, they issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/$10^{th}$ Joint Video Exploration Team—Joint Video Expert Team (JVET) meeting. With careful evaluation, JVET formally launched the standardization of next-generation video coding beyond HEVC, i.e., the so-called Versatile Video Coding (VVC).

Prior to HEVC, in December of 2001, VCEG and the Moving Picture Experts Group (MPEG) ISO/IEC JTC 1/SC 29/WG 11 formed a Joint Video Team (JVT), with the charter to finalize the draft new video coding standard for formal approval submission as H.264/AVC in March 2003. H.264/AVC was approved by ITU-T as Recommendation H.264 and by ISO/IEC as International Standard 14 496-10 (MPEG-4 part 10) Advanced Video Coding (AVC).

SUMMARY

According to one or more embodiments, a method performed by at least one processor is provided. The method includes receiving a coded picture, and reconstructing a current block of the coded picture. The reconstructing includes: segmenting samples of the current block into a plurality of segments including a first segment and a second segment; predicting the first segment of the current block of the coded picture by using a first prediction mode; and predicting the second segment of the current block of the coded picture by using a second prediction mode, different from the first prediction mode.

According to an embodiment, the first prediction mode is an intra block copy (IBC) mode, and the second prediction mode is an intra prediction mode that uses neighboring reconstructed samples to perform intra prediction.

According to an embodiment, the reconstructing the current block further includes signaling the first prediction mode.

According to an embodiment, the reconstructing the current block includes signaling the second prediction mode.

According to an embodiment, the segmenting includes: calculating at least one threshold value based on the samples of the current block; and segmenting the samples of the current block based on the at least one threshold value.

According to an embodiment, the reconstructing the current block further includes segmenting samples of a reference block of the coded picture into a plurality of segments such as to obtain segmentation information of the reference block, and the segmenting the samples of the current block includes mapping the segmentation information of the reference block to the current block.

According to an embodiment, the predicting the first segment of the current block includes identifying, before the segmenting the samples of the reference block and before the segmenting the samples of the current block, the reference block based on a block vector, and wherein the mapping includes mapping the segmentation information of the reference block to the current block based on the block vector.

According to an embodiment, the predicting the second segment of the current block includes obtaining a prediction block that predicts the second segment of the current block, and the predicting the first segment of the current block further includes obtaining a combined prediction block by combining, using the segmentation information, the prediction block of the current block with a segment of the reference block that corresponds to the first segment of the current block.

According to an embodiment, the segmentation information is a segmentation map.

According to an embodiment, the segmenting the samples of the current block is performed before the predicting the first segment.

According to one or more embodiments, a system is provided. The system includes: at least one memory configured to store computer program code; and at least one processor configured to access the computer program code and operate as instructed by the computer program code. The computer program code includes reconstructing code configured to cause the at least one processor to reconstruct a current block of a coded picture that is received. The reconstructing code includes: current block segmenting code configured to cause the at least one processor to segment samples of the current block into a plurality of segments including a first segment and a second segment; first prediction code configured to cause the at least one processor to predict the first segment of the current block of the coded picture by using a first prediction mode; and second prediction code configured to cause the at least one processor to predict the second segment of the current block of the coded picture by using a second prediction mode, different from the first prediction mode.

According to an embodiment, the first prediction mode is an intra block copy (IBC) mode, and the second prediction mode is an intra prediction mode that uses neighboring reconstructed samples to perform intra prediction.

According to an embodiment, the reconstructing code further includes signaling code that is configured to cause the at least one processor to signal the first prediction mode.

According to an embodiment, the reconstructing code further includes signaling code that is configured to cause the at least one processor to signal the second prediction mode.

According to an embodiment, the current block segmenting code is further configured to cause the at least one processor to: calculate at least one threshold value based on the samples of the current block; and segment the samples of the current block based on the at least one threshold value.

According to an embodiment, the reconstructing code further includes reference block segmenting code that is configured to cause the at least one processor to segment samples of a reference block of the coded picture into a plurality of segments such as to obtain segmentation information of the reference block, and the current block segmenting code is configured to cause the at least one processor to map the segmentation information of the reference block to the current block.

According to an embodiment, the first prediction code is configured to cause the at least one processor to identify, before the samples of the reference block and the samples of the current block are segmented by the at least one processor, the reference block based on a block vector, and the current block segmenting code is configured to cause the at least one processor to map the segmentation information of the reference block to the current block based on the block vector.

According to an embodiment, the second prediction code is configured to cause the at least one processor to obtain a prediction block that predicts the second segment of the current block, and the first prediction code is configured to cause the at least one processor to obtain a combined prediction block by combining, using the segmentation information, the prediction block of the current block with a segment of the reference block that corresponds to the first segment of the current block.

According to an embodiment, the segmentation information is a segmentation map.

According to one or more embodiments, a non-transitory computer-readable medium storing computer instructions is provided. The computer instructions are configured to, when executed by at least one processor, cause the at least one processor to reconstruct a current block of a coded picture that is received by: segmenting samples of the current block into a plurality of segments including a first segment and a second segment; predict the first segment of the current block of the coded picture by using a first prediction mode; and predict the second segment of the current block of the coded picture by using a second prediction mode, different from the first prediction mode.

BRIEF DESCRIPTION OF THE DRAWINGS

Further features, the nature, and various advantages of the disclosed subject matter will be more apparent from the following detailed description and the accompanying drawings in which:

FIG. 18 is a diagram of a computer system suitable for implementing embodiments of the present disclosure.

DETAILED DESCRIPTION

Embodiments of the present disclosure include video coding approaches, which can apply on top of multiple existing video coding standard, including but not limited to H.264/AVC, HEVC, VVC, and AV1.

In the present disclosure, the term "block" may be interpreted as a prediction block, a coding block, or a coding unit (CU). The term "block" here may also be used to refer to a transform block.

Figure 1:
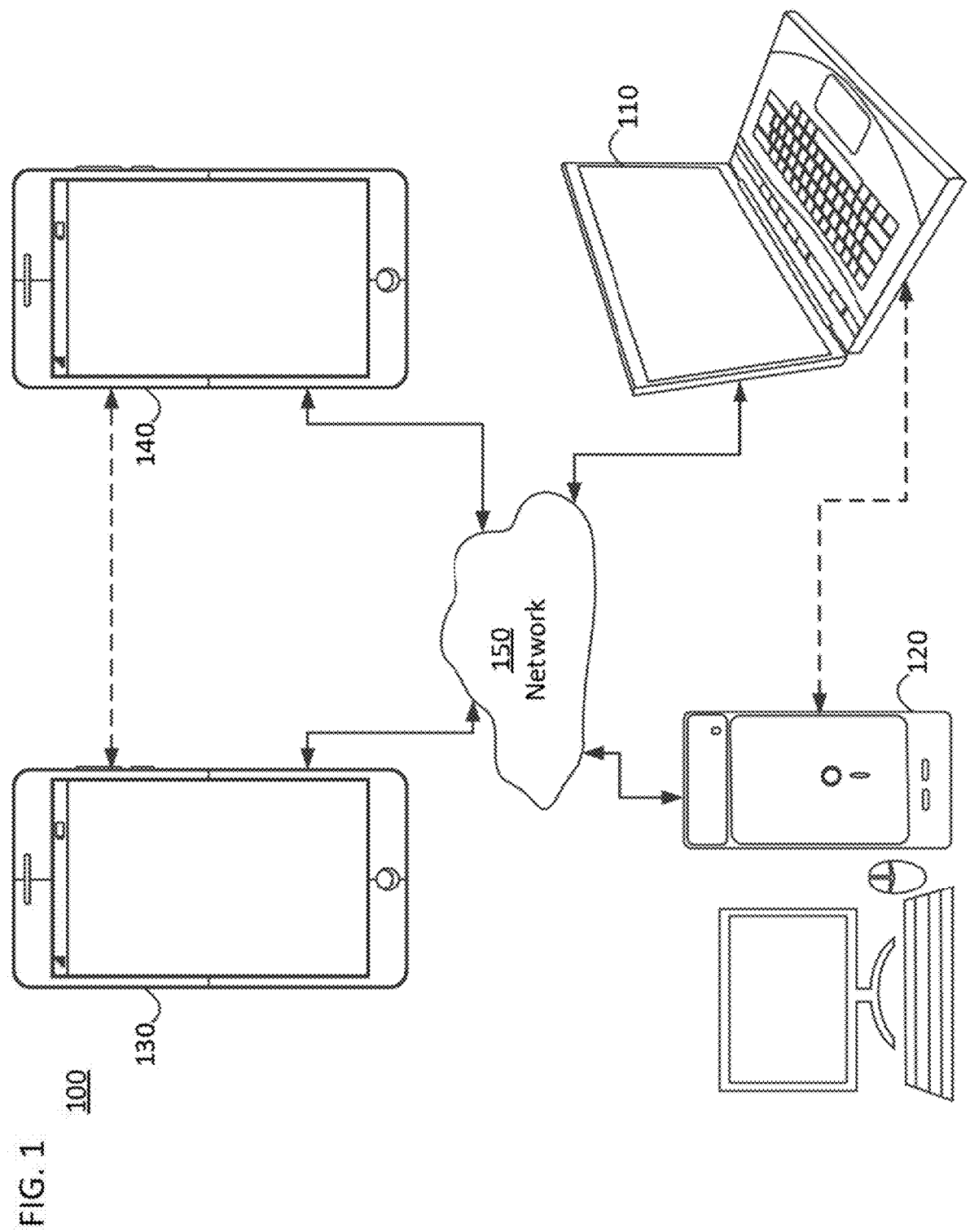
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
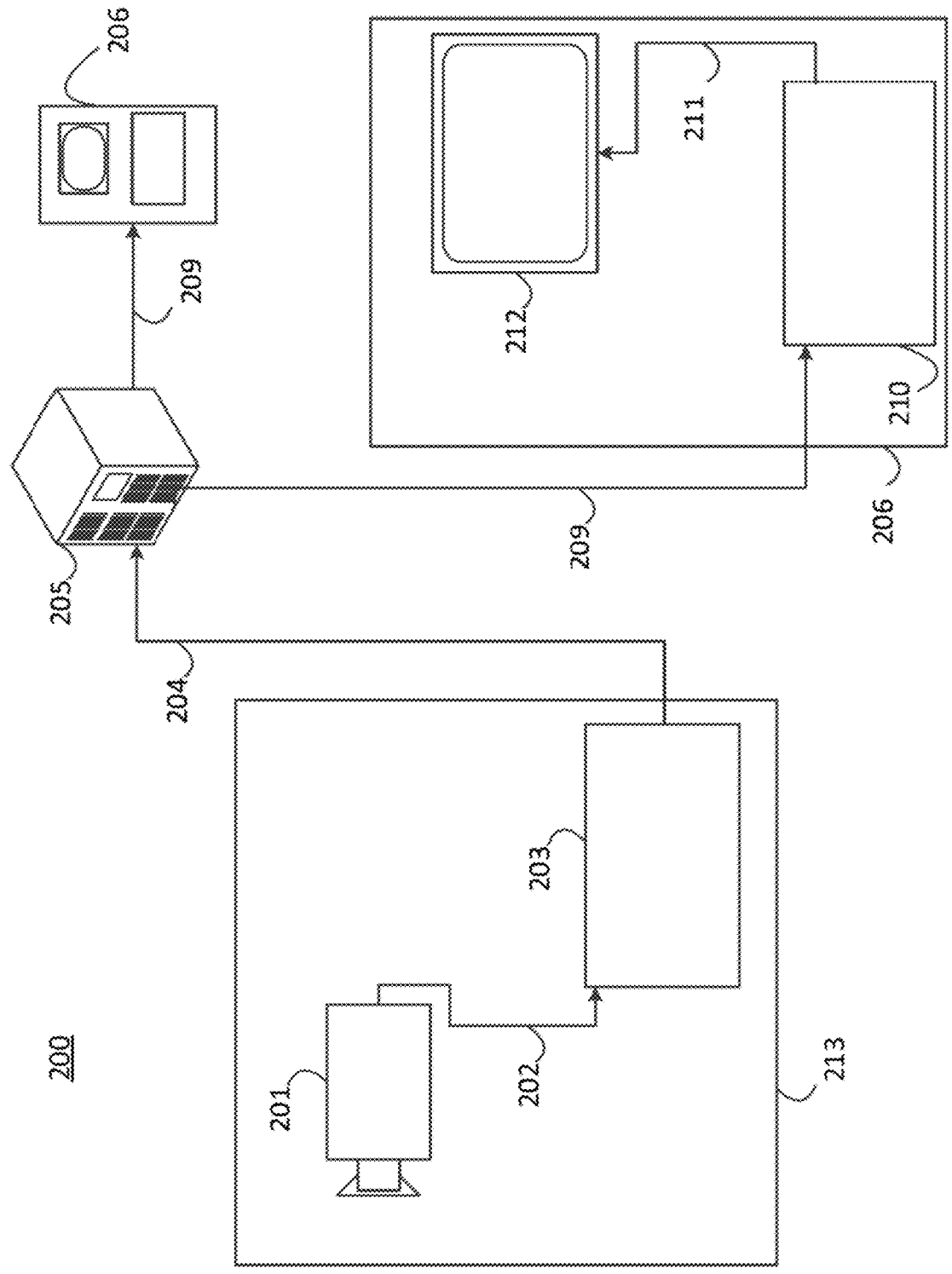
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
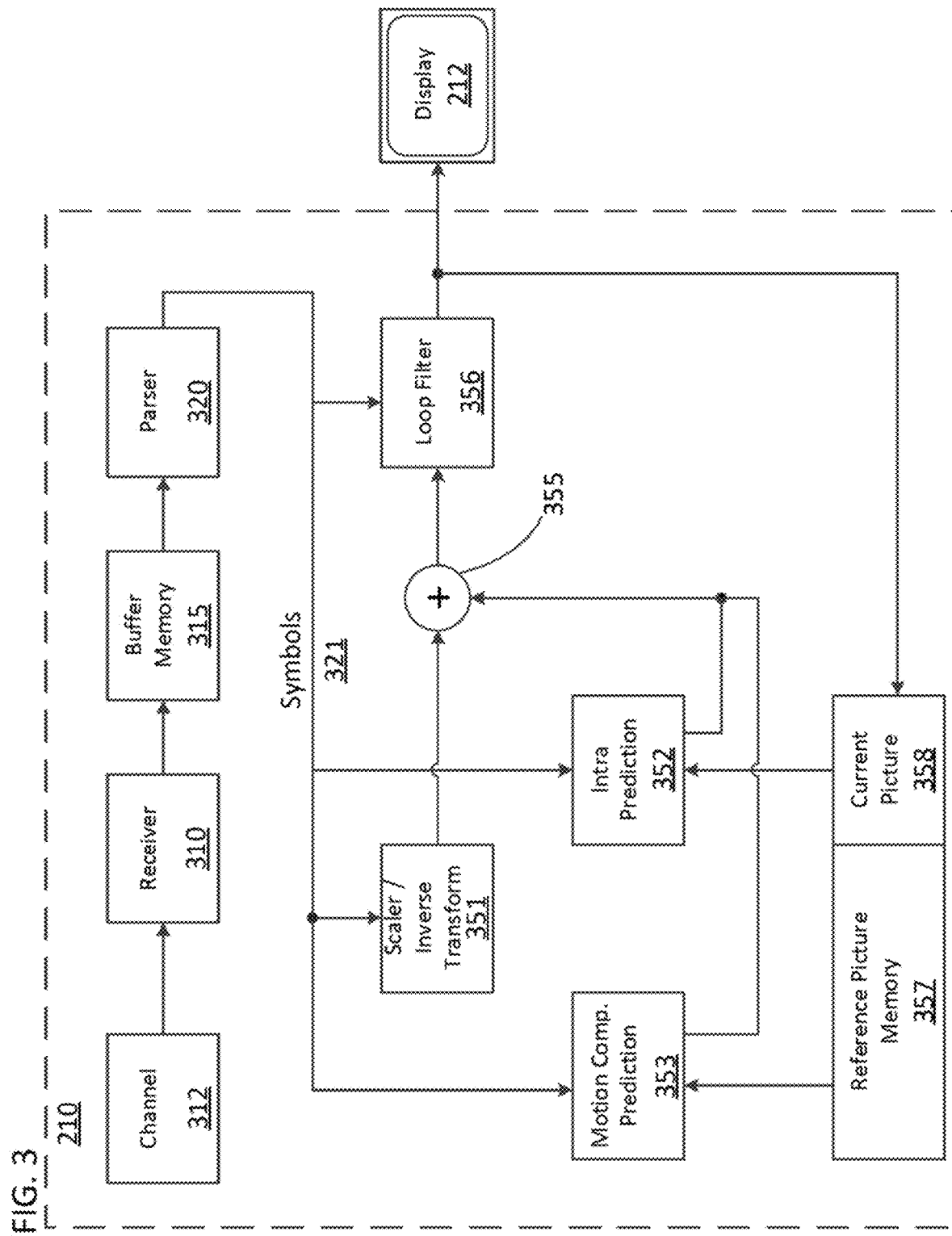
FIG. 3 is a schematic illustration of a simplified block diagram of a decoder in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or can be small. For use on best effort packet networks such as the Internet, the buffer (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
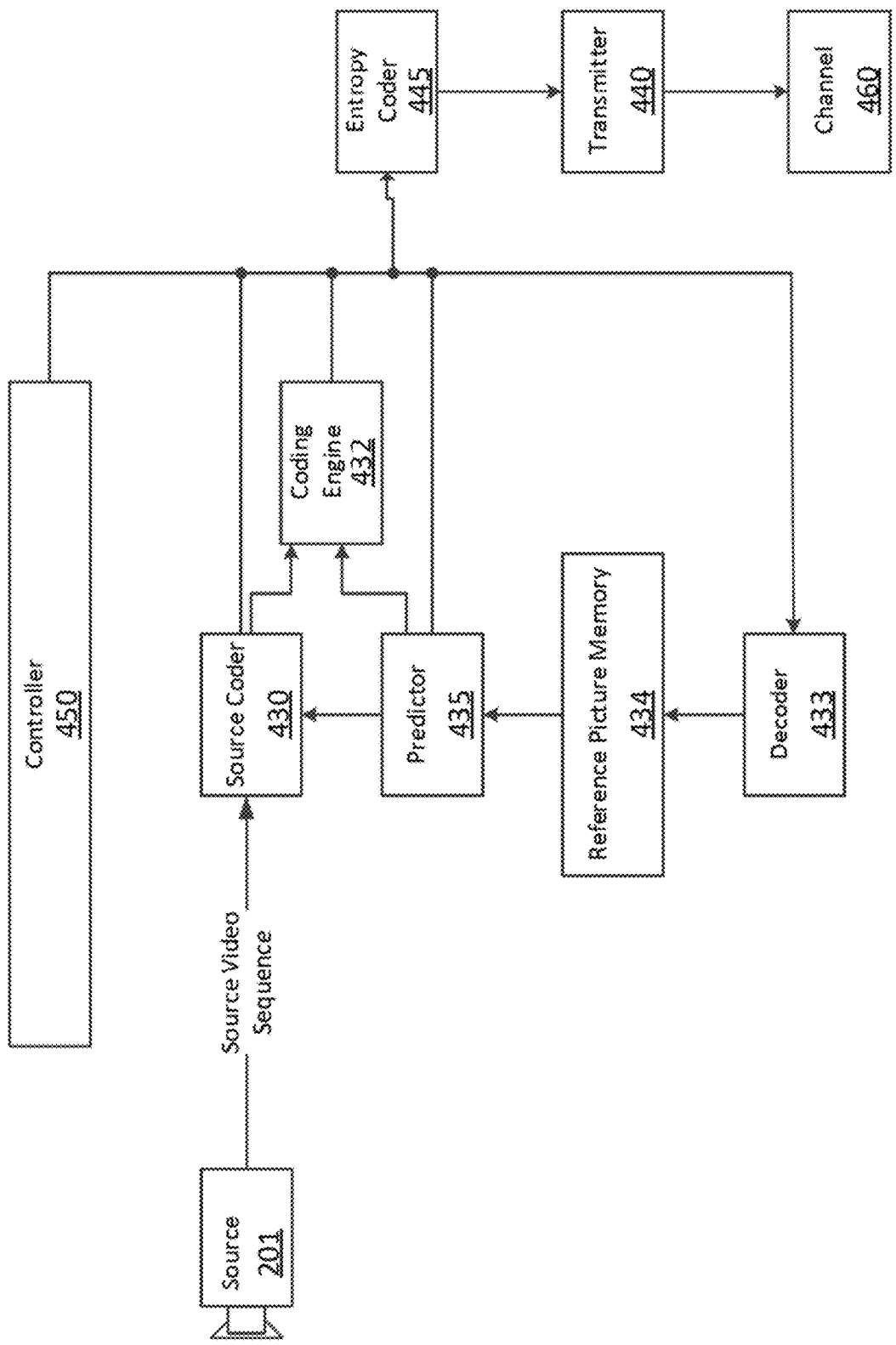
FIG. 4 is a schematic illustration of a simplified block diagram of an encoder in accordance with an embodiment.
Figure 5D:
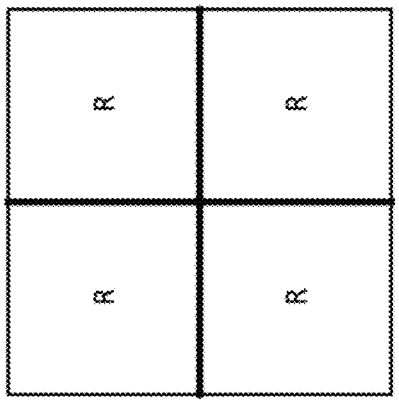
FIG. 5D a diagram illustrating a fourth example partition structure of VP9.
Figure 5C:
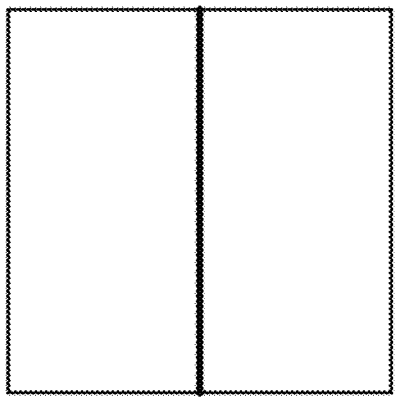
FIG. 5C a diagram illustrating a third example partition structure of VP9.
Figure 5B:
FIG. 5B a diagram illustrating a second example partition structure of VP9.
Figure 5A:
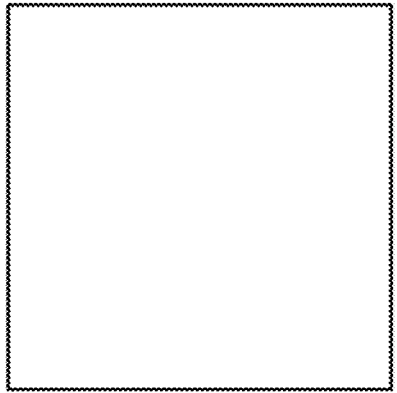
FIG. 5A a diagram illustrating a first example partition structure of VP9.
Figure 6A:
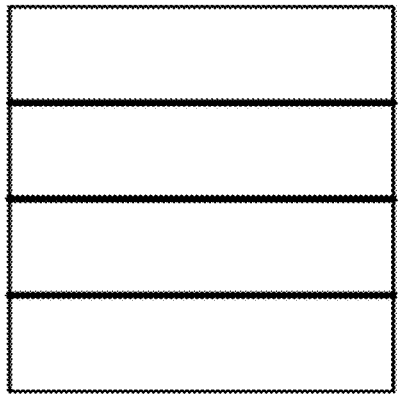
FIG. 6A a diagram illustrating a first example partition structure of AV1.
Figure 6B:
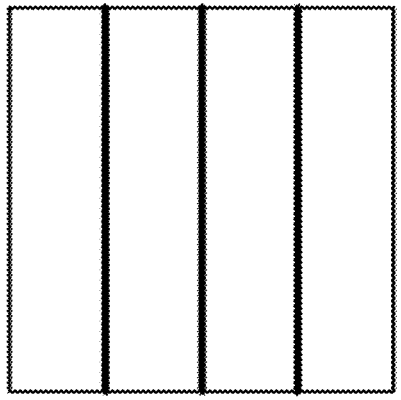
FIG. 6B a diagram illustrating a second example partition structure of AV1.
Figure 6C:
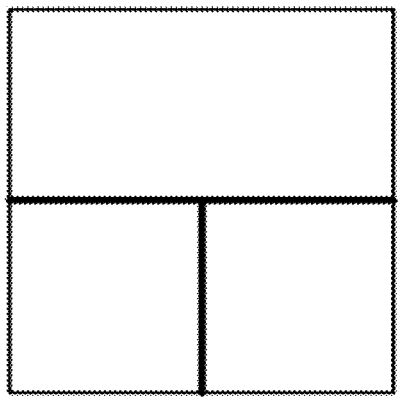
FIG. 6C a diagram illustrating a third example partition structure of AV1.
Figure 6D:
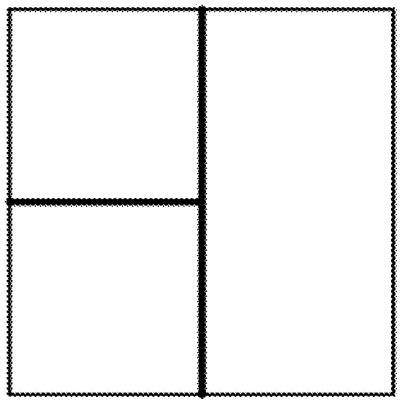
FIG. 6D a diagram illustrating a fourth example partition structure of AV1.
Figure 6E:
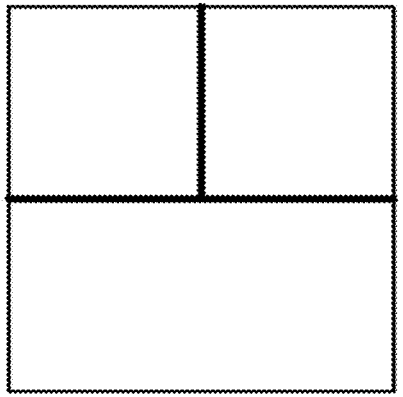
FIG. 6E a diagram illustrating a fifth example partition structure of AV1.
Figure 6F:
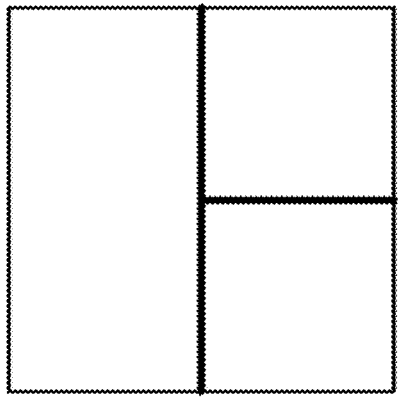
FIG. 6F a diagram illustrating a sixth example partition structure of AV1.
Figure 6G:
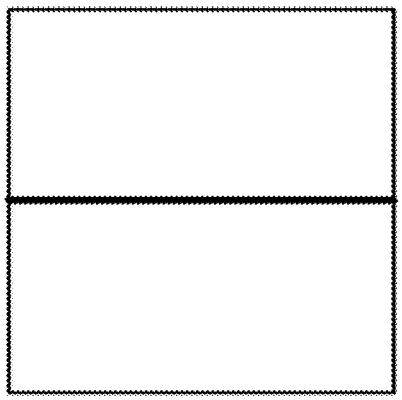
FIG. 6G a diagram illustrating a seventh example partition structure of AV1.
Figure 6H:
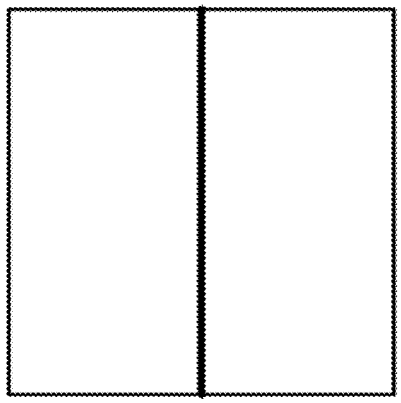
FIG. 6H a diagram illustrating an eighth example partition structure of AV1.
Figure 6J:
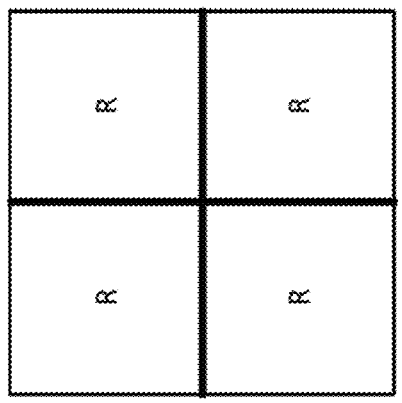
FIG. 6J a diagram illustrating a tenth example partition structure of AV1.
Figure 6I:
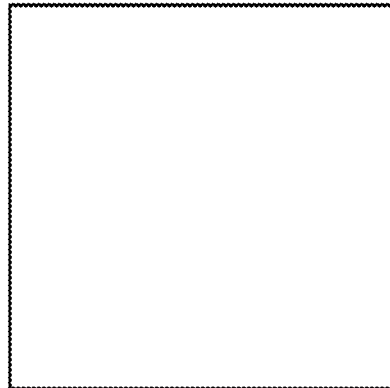
FIG. 6I a diagram illustrating a ninth example partition structure of AV1.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an over-simplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

[Coding Block Partition in VP9 and AV1]

With reference to partition structures (502)-(508) of FIGS. 5A-D, VP9 uses a 4-way partition tree starting from the 64×64 level down to 4×4 level, with some additional restrictions for blocks 8×8. Note that partitions designated as R in FIG. 5D refer to recursion in that the same partition tree is repeated at a lower scale until the lowest 4×4 level is reached.

With reference to partition structures (511)-(520) of FIGS. 6A-J, AV1 not only expands the partition-tree to a 10-way structure, but also increases the largest size (referred to as superblock in VP9/AV1 parlance) to start from 128×128. Note that this includes 4:1/1:4 rectangular partitions that did not exist in VP9. The partition types with 3 sub-partitions as shown in FIGS. 6C-F is called a "T-type" partition. None of the rectangular partitions may be further subdivided. In addition to coding block size, coding tree depth may be defined to indicate the splitting depth from the root note. To be specific, the coding tree depth for the root node, e.g. 128×128, is set to 0, and after tree block is further split once, the coding tree depth is increased by 1.

Instead of enforcing fixed transform unit sizes as in VP9, AV1 allows luma coding blocks to be partitioned into transform units of multiple sizes that can be represented by a recursive partition going down by up to 2 levels. To incorporate AV1's extended coding block partitions, square, 2:1/1:2, and 4:1/1:4 transform sizes from 4×4 to 64×64 may be supported. For chroma blocks, only the largest possible transform units may be allowed.

[Block Partitioning in HEVC]

In HEVC, a coding tree unit (CTU) may be split into coding units (CUs) by using a quadtree (QT) structure denoted as a coding tree to adapt to various local characteristics. The decision on whether to code a picture area using inter-picture (temporal) or intra-picture (spatial) prediction may be made at the CU level. Each CU can be further split into one, two, or four prediction units (PUs) according to the PU splitting type. Inside one PU, the same prediction process may be applied and the relevant information is transmitted to the decoder on a PU basis. After obtaining the residual block by applying the prediction process based on the PU splitting type, a CU can be partitioned into transform units (TUs) according to another quad tree structure like the coding tree for the CU. One of key features of the HEVC structure is that it has the multiple partition concepts including CU, PU, and TU. In HEVC, a CU or a TU can only have a square shape, while a PU may have a square or rectangular shape for an inter predicted block. In HEVC, one coding block may be further split into four square sub-blocks, and transform is performed on each sub-block (i.e. TU). Each TU can be further split recursively (using quadtree split) into smaller TUs, which is called a Residual Quad-Tree (RQT).

At picture boundary, HEVC employs implicit quad-tree split so that a block will keep quad-tree splitting until the size fits the picture boundary.

[Quadtree with Nested Multi-Type Tree Coding Block Structure in VVC]

Figure 7A:
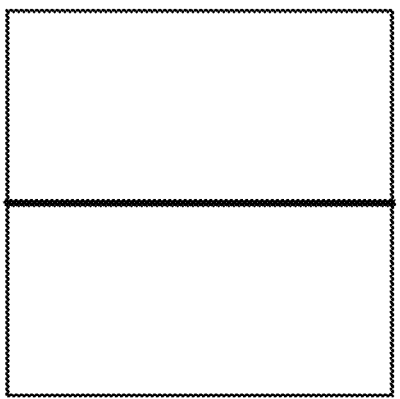
FIG. 7A is a diagram for demonstrating vertical binary splitting type in a multi-type tree structure.
Figure 7B:
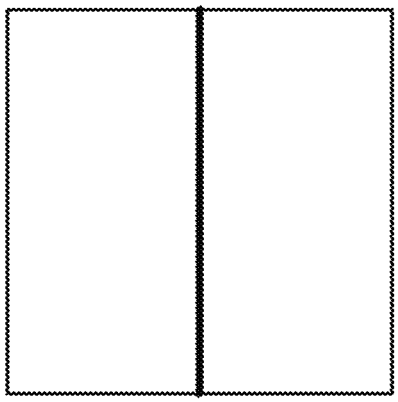
FIG. 7B is a diagram for demonstrating horizontal binary splitting type in a multi-type tree structure.
Figure 7C:
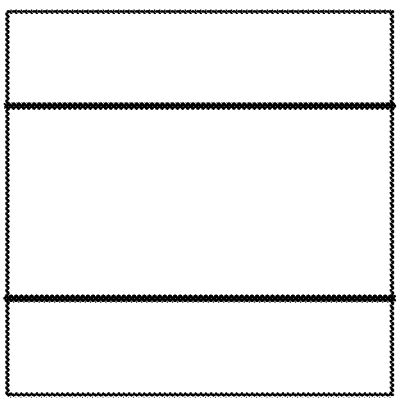
FIG. 7C is a diagram for demonstrating vertical ternary splitting type in a multi-type tree structure.
Figure 7D:
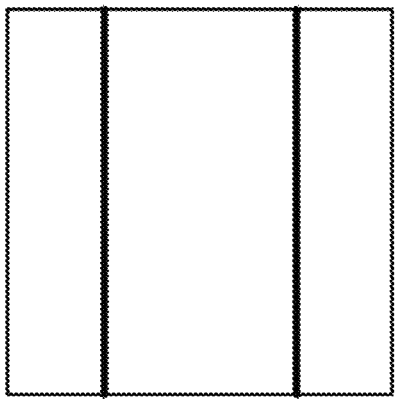
FIG. 7D is a diagram for demonstrating horizontal ternary splitting type in a multi-type tree structure.
Figure 8:
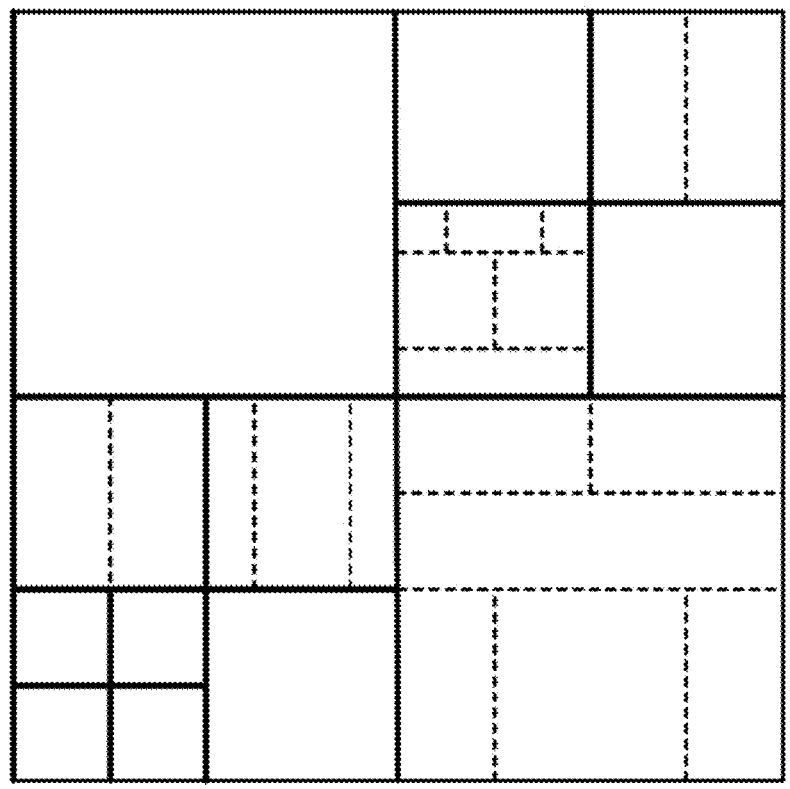
FIG. 8 is a diagram illustrating an example of a CTU divided into multiple CUs with a quad tree and nested multi-type tree coding block structure.

In VVC, a quadtree with nested multi-type tree using binary and ternary splits segmentation structure replaces the concepts of multiple partition unit types. That is, VVC does not include the separation of the CU, PU, and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quad tree) structure. Then, the quaternary tree leaf nodes can be further partitioned by a multi-type tree structure. As shown in diagrams (532), (534), (536), and (538) of FIGS. 7A-D, there are four splitting types in multi-type tree structure: vertical binary splitting (SPLIT_BT_VER) as illustrated in FIG. 7A, horizontal binary splitting (SPLIT_BT_HOR) as illustrated in FIG. 7B, vertical ternary splitting (SPLIT_TT_VER) as illustrated in FIG. 7C, and horizontal ternary splitting (SPLIT_TT_HOR) as illustrated in FIG. 7D. The multi-type tree leaf nodes may be called coding units (CUs), and unless the CU is too large for the maximum transform length, this segmentation may be used for prediction and transform processing without any further partitioning. This means that, in most cases, the CU, PU and TU have the same block size in the quadtree with nested multi-type tree coding block structure. The exception occurs when maximum supported transform length is smaller than the width or height of the color component of the CU. One example of block partition for one CTU is shown in FIG. 8. FIG. 8 shows a CTU (540) divided into multiple CUs with a quadtree and nested multi-type tree coding block structure, where the bold line edges represent quadtree partitioning and the broken line edges represent multi-type tree partitioning. The quadtree with nested multi-type tree partition provides a content-adaptive coding tree structure comprised of CUs.

In VVC, the maximum supported luma transform size is 64×64 and the maximum supported chroma transform size is 32×32. When the width or height of the CB is larger than the maximum transform width or height, the CB may be automatically split in the horizontal and/or vertical direction to meet the transform size restriction in that direction.

In VTM7, the coding tree scheme supports the ability for the luma and chroma to have a separate block tree structure. For P and B slices, the luma and chroma CTBs in one CTU may have to share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice may consist of coding blocks of all three colour components unless the video is monochrome.

[Directional Intra Prediction in AV1]

Figure 9:
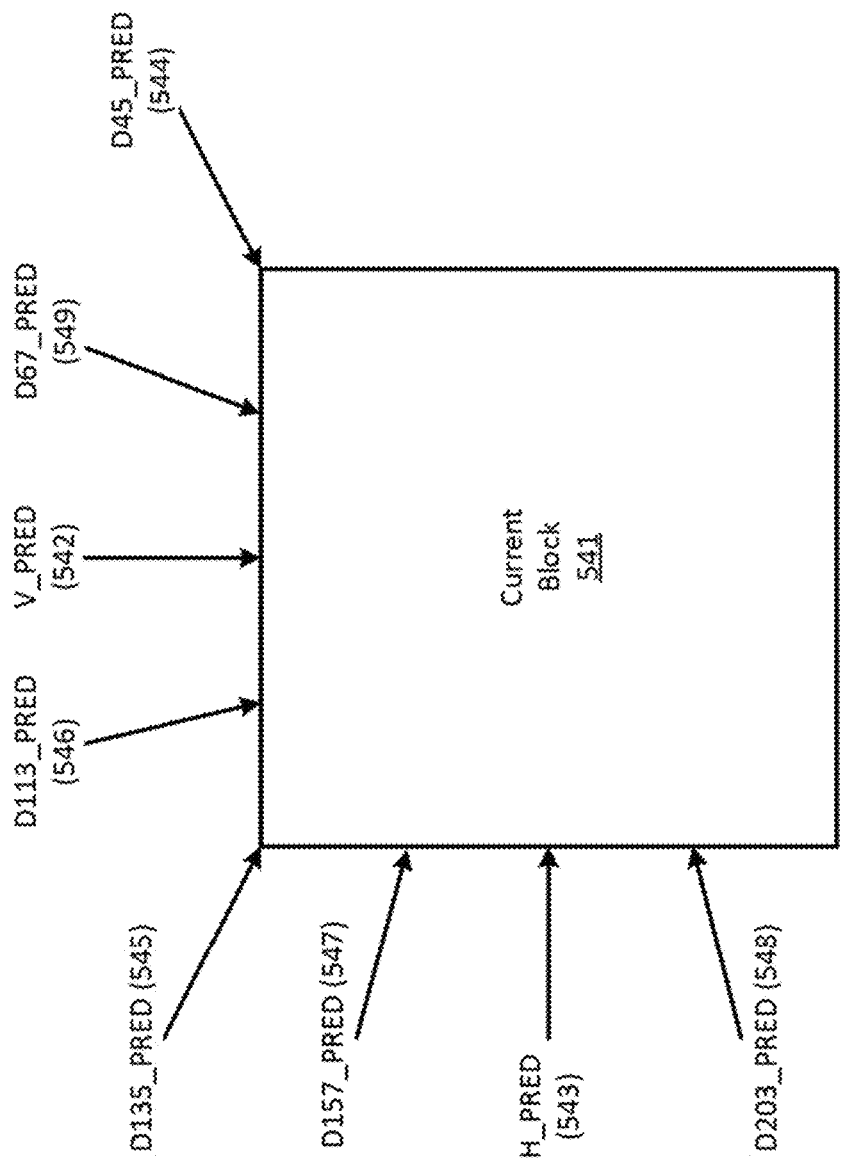
FIG. 9 is a diagram illustrating eight nominal angles in AV1.

VP9 supports eight directional modes corresponding to angles from 45 to 207 degrees. To exploit more varieties of spatial redundancy in directional textures, in AV1, directional intra modes are extended to an angle set with finer granularity. The original eight angles are slightly changed and made as nominal angles, and these 8 nominal angles are named as V_PRED (542), H_PRED (543), D45_PRED (544), D135_PRED (545), D113_PRED (546), D157_PRED (547), D203_PRED (548), and D67_PRED (549), which are illustrated in FIG. 9 with respect to a current block (541). For each nominal angle, there are seven finer angles, so AV1 has 56 directional angles in total. The prediction angle is presented by a nominal intra angle plus an angle delta, which is −3~3 multiples of the step size of 3 degrees. To implement directional prediction modes in AV1 via a generic way, all the 56 directional intra prediction mode in AV1 are implemented with a unified directional predictor that projects each pixel to a reference sub-pixel location and interpolates the reference pixel by a 2-tap bilinear filter.

[Non-Directional Smooth Intra Predictors in AV1]

Figure 10:
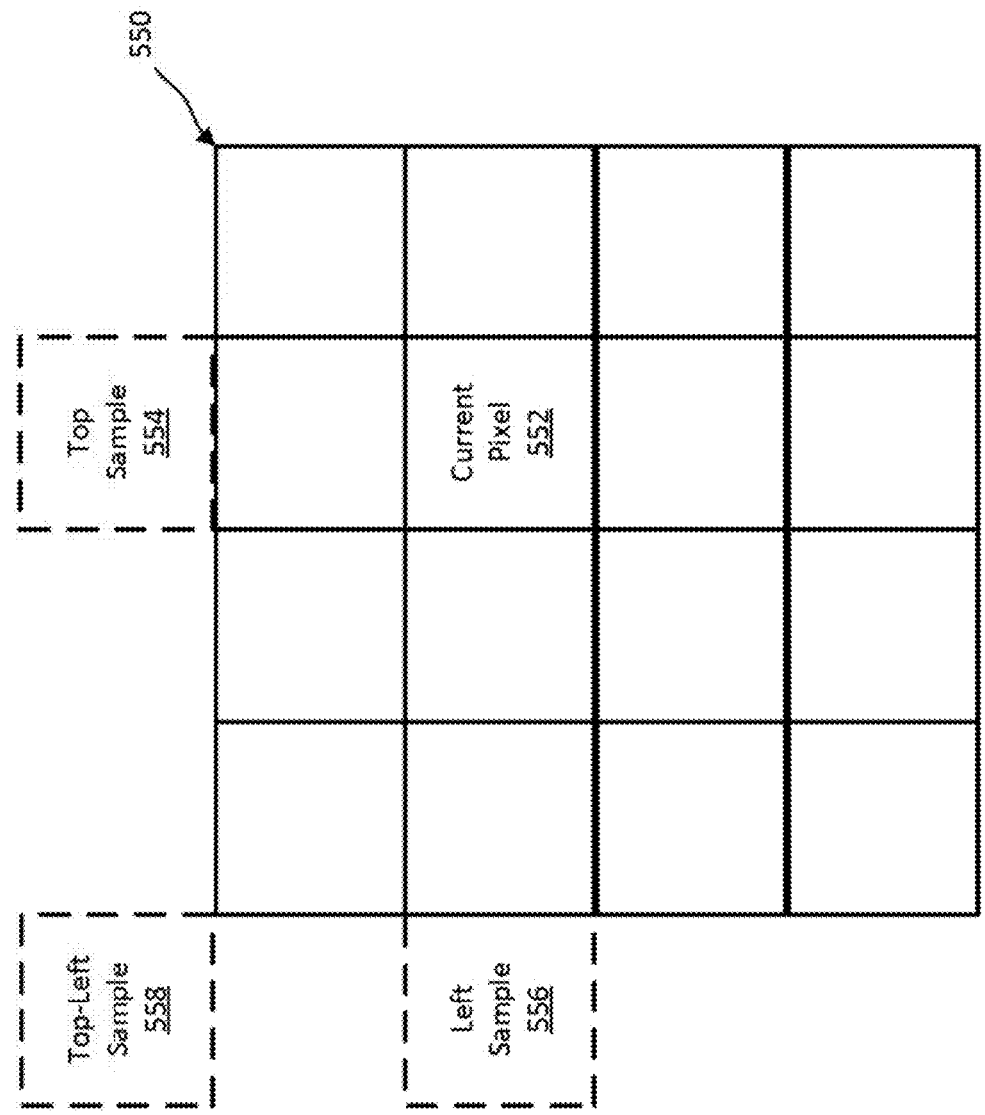
FIG. 10 is a diagram illustrating a current block and samples.

In AV1, there are five non-directional smooth intra prediction modes, which are DC, PAETH, SMOOTH, SMOOTH_V, and SMOOTH_H. For DC prediction, the average of left and above neighboring samples is used as the predictor of the block to be predicted. For PAETH predictor, top, left, and top-left reference samples are firstly fetched, and then the value which is closest to (top+left−topleft) is set as the predictor for the pixel to be predicted. FIG. 10 illustrates the positions of a top sample (554), a left sample (556), and a top-left sample (558) for a current pixel (552) in a current block (550). For SMOOTH, SMOOTH_V, and SMOOTH_H modes, the current block (550) is predicted using quadratic interpolation in vertical or horizontal directions, or the average of both directions.

[Chroma Predicted from Luma]

For chroma component, besides 56 directional modes and 5 non-directional mode, chroma from luma (CfL) is a chroma-only intra prediction mode, which models chroma pixels as a linear function of coincident reconstructed luma pixels. The CfL prediction may be expressed as shown below in Equation 1:

$$CfL(\alpha)=\alpha \times L_{AC}+DC \quad \text{(Equation 1)}$$

wherein $L_{AC}$ denotes the AC contribution of the luma component, α denotes the parameter of the linear model, and DC denotes the DC contribution of the chroma component. To be specific, the reconstructed luma pixels are subsampled into the chroma resolution, and then the average value is subtracted to form the AC contribution. To approximate the chroma AC component from the AC contribution, instead of requiring the decoder to calculate the scaling parameters as in some background art, AV1 CfL determines the parameter a based on the original chroma pixels and signals them in the bitstream. This reduces decoder complexity and yields more precise predictions. As for the DC contribution of the chroma component, it may be computed using intra DC mode, which is sufficient for most chroma content and has mature fast implementations.

For the signaling of chroma intra prediction modes, eight nominal directional modes, 5 non-directional modes, and CfL mode may be firstly signaled. The context for signaling these modes may be dependent on the corresponding luma mode of the top-left position of a current block. Then, if the current chroma mode is a directional mode, one additional flag may be signaled to indicate the delta angle to the nominal angle.

[Intra Block Copy]

Block based compensation from a different picture may be referred to as motion compensation. Similarly, a block compensation can also be done from a previously reconstructed area within the same picture. This may be referred to as intra picture block compensation, current picture referencing (CPR), or intra block copy (IBC). A displacement vector that indicates the offset between the current block and the reference block may be referred as the block vector (BV). Different from a motion vector in motion compensation, which can be at any value (positive or negative, at either x or y direction), a block vector has a few constraints such that the pointed reference block is ensured to be available and already reconstructed. Also, for parallel processing consideration, some reference area that is a tile boundary or a wavefront ladder shape boundary may also be excluded.

The coding of a block vector may be either explicit or implicit. In the explicit mode (referred to as AMVP mode in inter coding), the difference between a block vector and its predictor may be signaled; in the implicit mode, the block vector may recovered purely from its predictor, in a similar way as a motion vector in merge mode. The resolution of a block vector, in some implementations, is restricted to integer positions; in other systems, it may be allowed to point to fractional positions.

The use of intra block copy at block level can be signaled using a block level flag (e.g. an IBC flag). In one embodiment, this flag is signaled when the current block is not coded in merge mode. Or, it can be signaled by a reference index approach. This may be done by treating the current decoded picture as a reference picture. In HEVC SCC, such a reference picture may be put in the last position of the list. This special reference picture may also be managed together with other temporal reference pictures in the decoded picture buffer (DPB).

Figure 11:
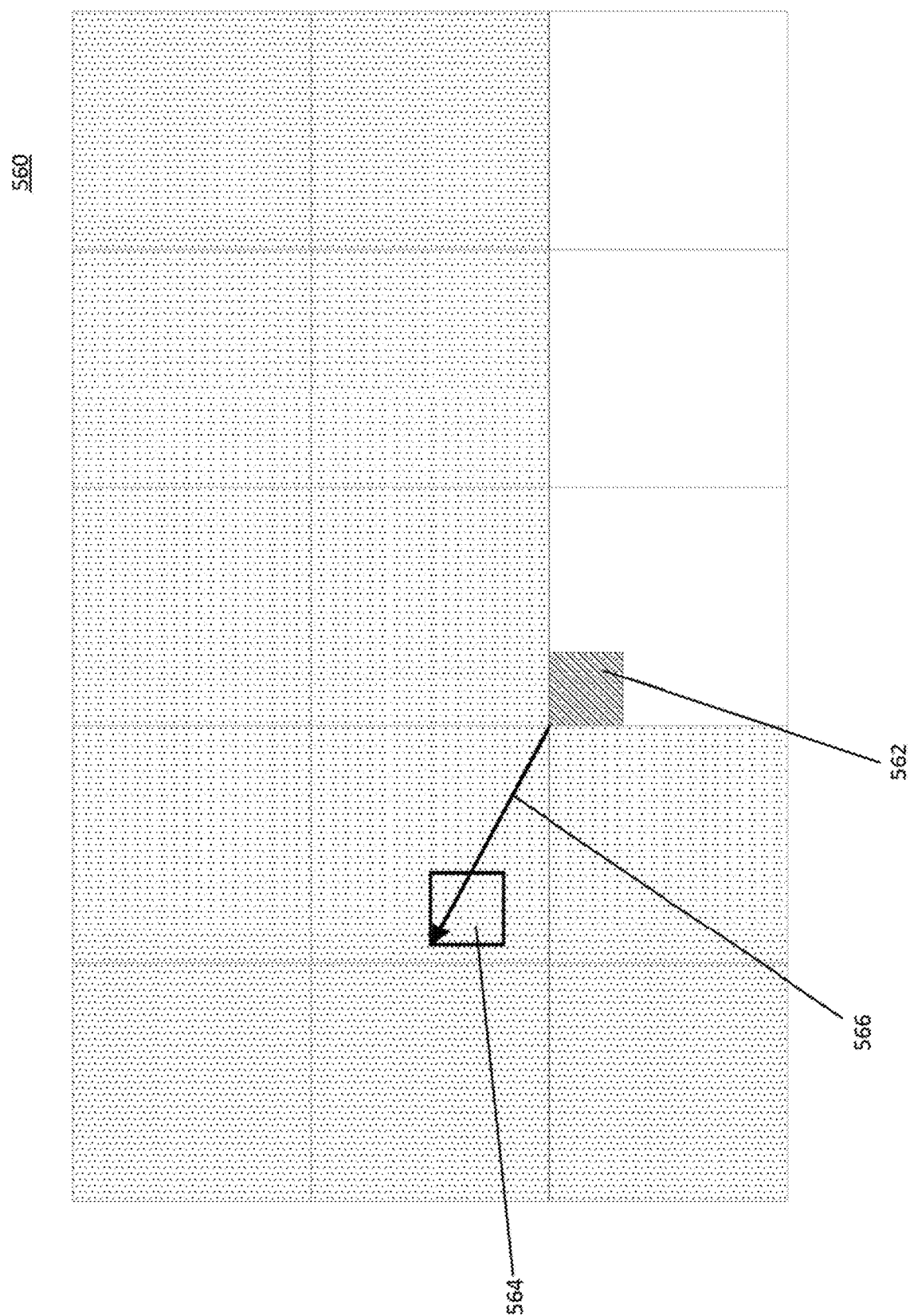
FIG. 11 is a diagram illustrating an example of intra block copy compensation.

There are also some variations for intra block copy, such as treating the intra block copy as a third mode, which is different from either intra or inter prediction mode. By doing this, the block vector prediction in merge mode and AMVP mode are separated from regular inter mode. For example, a separate merge candidate list is defined for intra block copy mode, where all the entries in the list are block vectors. Similarly, the block vector prediction list in intra block copy AMVP mode only consists of block vectors. A general rule applied to both lists is that they may follow the same logic as inter merge candidate list or AMVP predictor list in terms of candidate derivation process. For example, the five spatial neighboring locations in HEVC or VVC inter merge mode are accessed for intra block copy to derive its own merge candidate list. An example of intra block copy is shown in FIG. 11, which illustrates a current picture (560) in which a current block (562) is predicted based on a reference block (564) whose position is indicated by a block vector (566).

IBC (also called IntraBC) is very effective for screen content coding, but it also brings a lot of difficulties to hardware design. To facilitate the hardware design, the following modifications may be adopted in AV1.

Modification 1: When IBC is allowed, the loop filters are disabled, which are de-blocking filter, the CDEF (Constrained Directional Enhancement Filter), and the Loop Restoration. By doing this, picture buffer of reconstructed samples can be shared between IBC and inter prediction.

Modification 2: To facilitate parallel decoding, the prediction cannot exceed the restricted areas. For one super block, if the coordinate of its top-left position is (x0, y0), the prediction at position (x, y) can be accessed by IBC, if y<y0 and x<x0+2*(y0−y)3.

Figure 12:
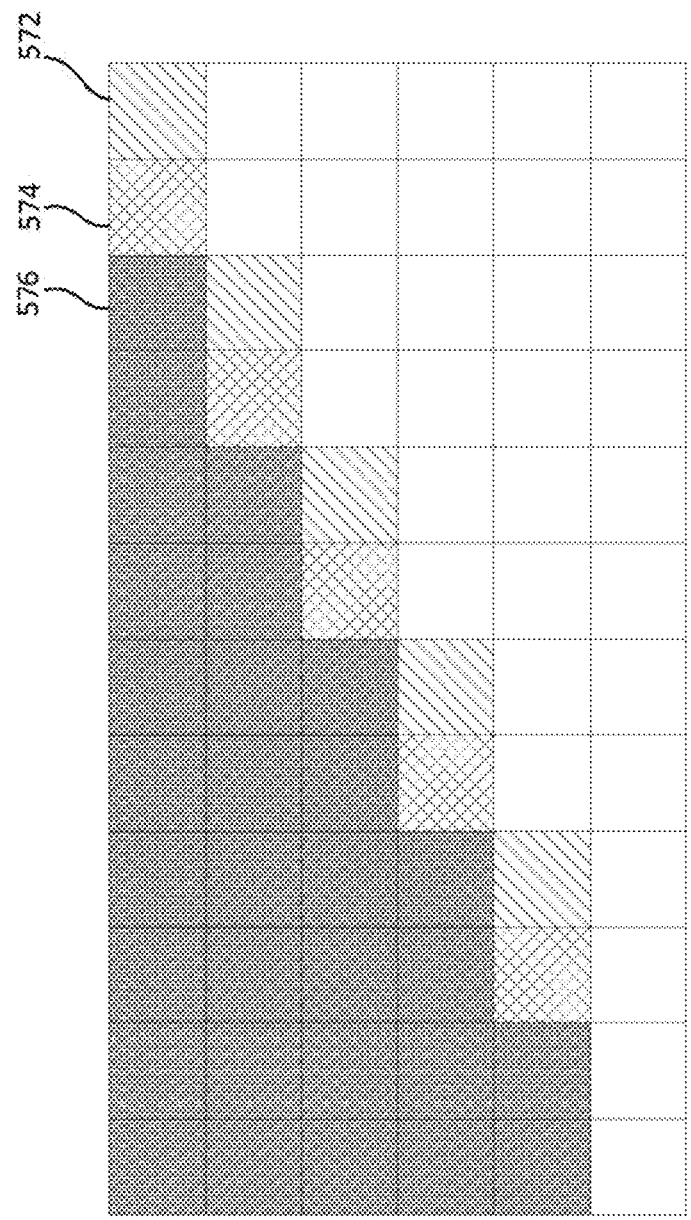
FIG. 12 is a diagram illustrating an example of current processing blocks, restricted immediate blocks, and allowed prediction blocks with respect to an embodiment of intra block copy prediction.

To allow hardware writing back delay, immediate reconstructed areas may not be accessed by IBC prediction. The restricted immediate reconstructed area can be 1~n super blocks. So on top of modification 2, if the coordinate of one super block's top-left position is (x0, y0), the prediction at position (x, y) can be accessed by IBC, if y<y0 and x<x0+ 2*(y0−y)−D, where D denotes the restricted immediate reconstructed area. When D is one super block, the prediction area may be as shown in FIG. 12. In FIG. 12, a plurality of current processing blocks (572) are shown with diagonal stripes, a plurality of restricted immediate blocks (574) are shown with cross-hatching, and a plurality of allowed prediction blocks (576) are shown with a dark pattern.

In VVC, the search range of IBC mode may be constrained to be within the current CTU. The effective memory requirement to store reference samples for IBC mode may be 1 CTU size of samples. Considering the existing reference sample memory to store reconstructed samples in current 64×64 region, three more 64×64 sized reference sample memory may be required. Based on this fact, a method of embodiments of the present disclosure may extend the effective search range of the IBC mode to some part of the left CTU while the total memory requirement for storing reference pixels are kept unchanged (1 CTU size, 4 64×64 reference sample memory in total). An example of such memory reuse mechanism is shown in FIGS. 13A-D, where the diagonally striped block is a current coding region, samples in the dotted patterned boxes are coded samples, and the crossed out regions (marked with "X") are not available for reference as they are replaced in the reference sample memory by the coding regions in current CTU.

Figure 13A:
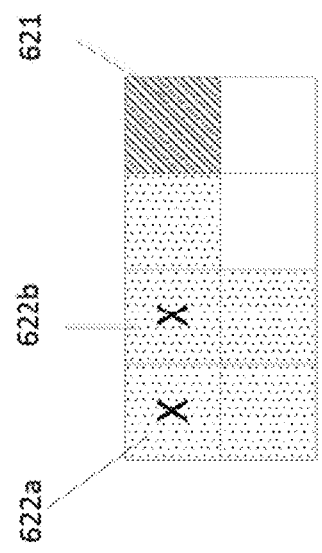
FIGS. 13A-D are illustrations of intra picture block compensation with one CTU size search range, in accordance with an embodiment.
Figure 13B:
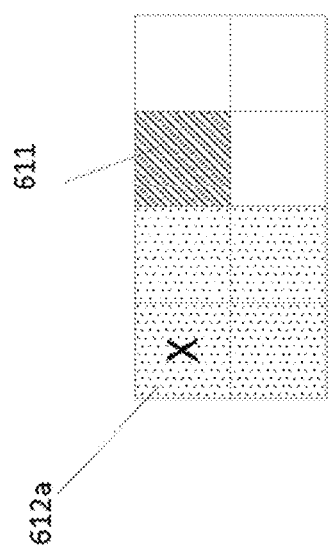
Figure 13C:
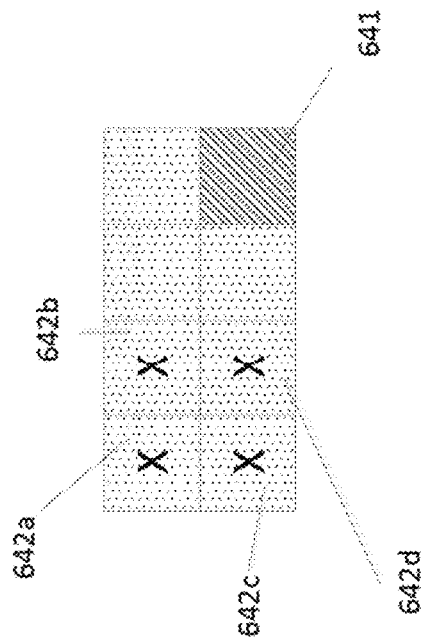
Figure 13D:
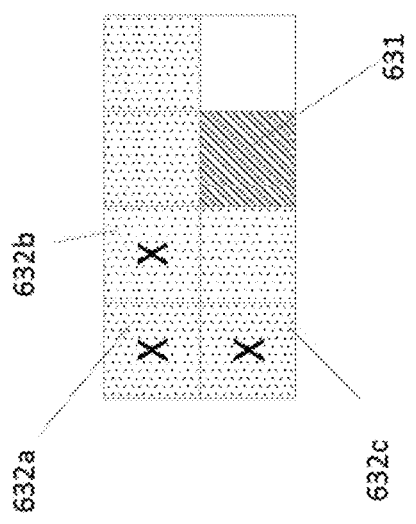

For example, in FIG. 13A, reference sample (612a), marked with an X, is unavailable for current sample (611). Similarly, in FIG. 13B, reference samples (622a) and (622b) are unavailable for current sample (621). In FIG. 13C, reference samples (632a), (632b), and (632c) are unavailable for current sample 631, and in FIG. 13D, reference samples (642a), (642b), (642c), and (642d) are unavailable for current sample (641).

[Problems with Coding Modes of Comparative Art]

Figure 14:
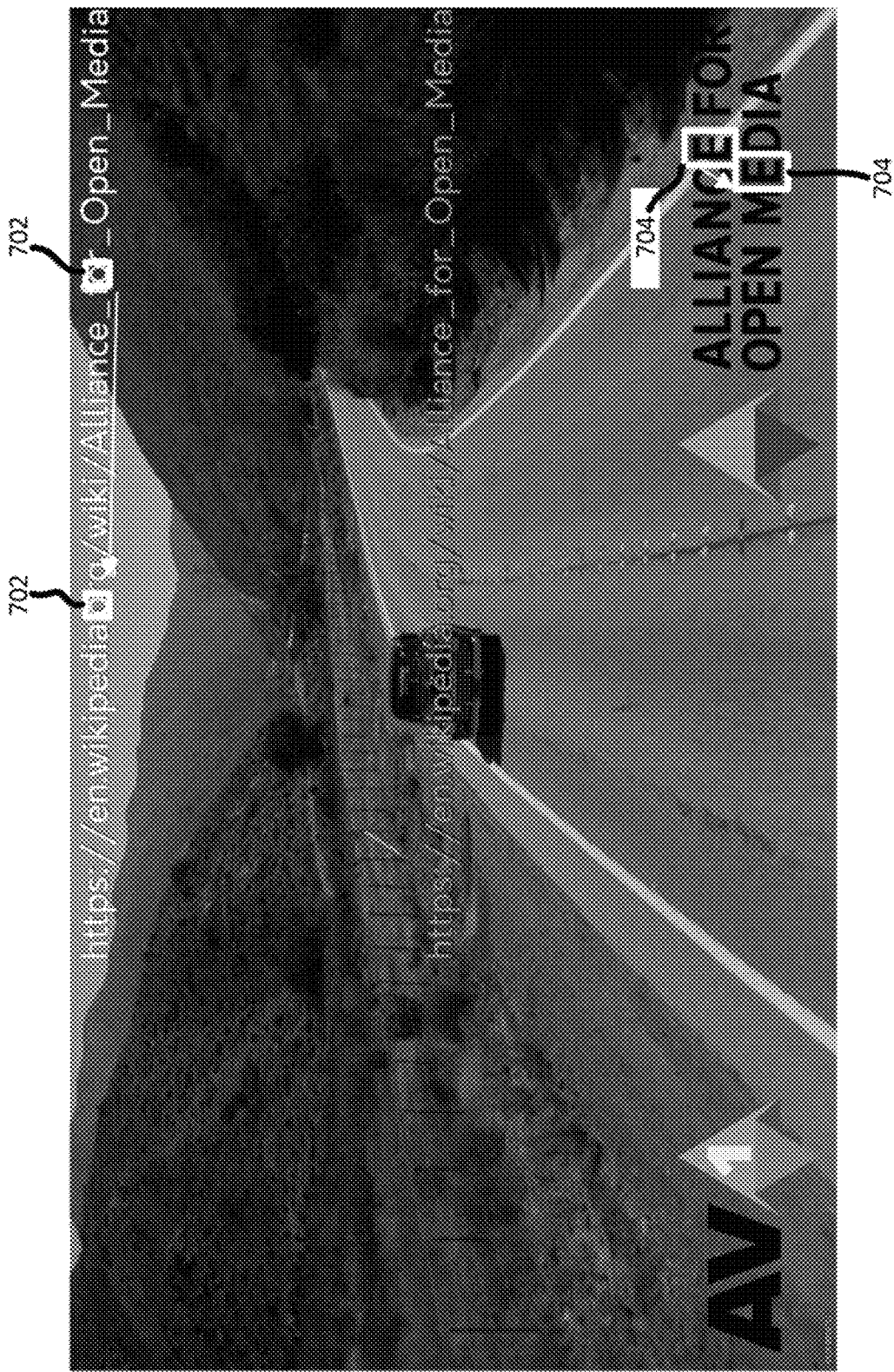
FIG. 14 illustrates an example of intra block copy applied to video content.

IBC as well as other coding modes may assume single texture pattern within one block. However, in many typical video contents, objects have occlusions to each other. For example, texts and logos that do not move are floating on top of the main video content that have completely different texture pattern or motion. For example, as shown in the video frame (700) illustrated in FIG. 14, it can be seen that there are examples of two matching characters "o" (702) and "E" (704). However, these matching characters are located on top of different backgrounds and IBC, which assumes all samples share the same block vector, and therefore cannot capture both texts and backgrounds efficiently.

[Example Aspects of Embodiments of the Present Disclosure]

Embodiments of the present disclosure may be used separately or combined in any order. Further, each embodiment (e.g. methods, encoders, and decoders) may be implemented by processing circuitry (e.g. one or more processors or one or more integrated circuits). In one example, the one or more processors execute a program that is stored in a non-transitory computer-readable medium.

Embodiments of the present disclosure may incorporate any number of aspects as described above. Embodiments of the present disclosure may also incorporate one or more of the aspects described below, and solve the problems discussed above and/or other problems.

A. First Aspect

Figure 15:
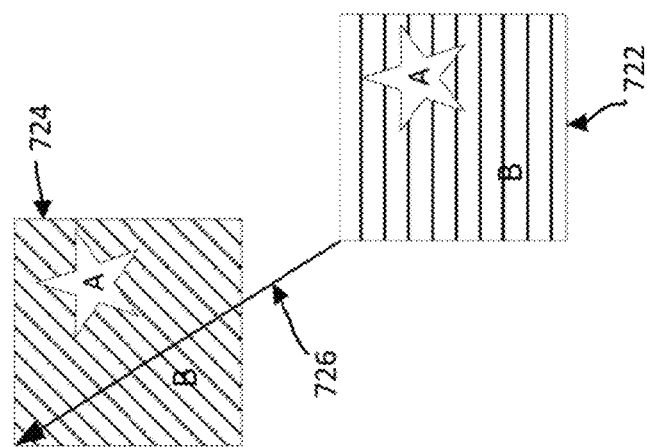
FIG. 15 is a diagram illustrating a single block in which a plurality of prediction modes are applied, according to embodiments of the present disclosure.

According to embodiments instead of applying one single prediction mode for a block, a plurality of prediction modes can be applied for a single block, and a segmentation process may be performed to divide the samples in the single block into different segments, and each segment may be associated with one of the selected prediction modes. Then, for samples that belong to a first segment, the associated first prediction mode is used to generate the prediction samples for the first segment; for samples that belong to a second segment, the associated second prediction mode is used to generate the prediction samples for the second segment, and so on. FIG. 15 illustrates an example of such process, where samples of a current block (722) are classified (segmented) into a first segment (A) and a second segment (B). Samples of the first segment (A) may be predicted by applying an IBC mode using a block vector (726) to fetch a prediction block (724), and samples of the second segment (B) may be predicted by applying a normal intra prediction mode using neighboring reconstructed samples to generate prediction values.

According to an embodiment, a plurality of prediction modes can be signaled for a block (e.g. the current block (722)). In one example, the plurality of prediction modes include an IBC prediction mode (including a block vector) and an intra prediction mode (including an intra prediction mode or direction) that uses neighboring reconstructed samples to perform the intra prediction.

According to an embodiment, IBC is applied together with one or more default intra prediction modes for a single block (e.g. the current block (722)), and only mode information related to IBC (e.g. block vector) is signaled. For samples within the single block, the IBC mode is applied for some samples, and the one or more default intra prediction modes are applied for the remaining samples. The default intra prediction modes include, but are not limited to, DC, Planar, SMOOTH, SMOOTH_H, SMOOTH_V, Paeth, and Plane modes.

According to an embodiment, IBC is applied together with one or more default intra prediction modes for a single block (e.g. the current block (722)), and the mode information related to IBC (e.g. block vector) is inferred. For samples within the single block, the IBC mode is applied for some samples, and the one or more default intra prediction modes are applied for the remaining samples. The inferred IBC information (block vector) can be derived (e.g. by a decoder) from a block vector predictor list, such as those used for generating a merge list. If more than one possible block vector candidate exists, an index value may be signaled for the selection of a block vector from the block vector predictor list. For example, the index value may be received by the decoder from the encoder. Otherwise, a default selection can be made without the encoder sending the index and the decoder receiving the index. In this case, for example, the first block vector candidate in the predictor list may be assumed (e.g. by the decoder) to be used. The default intra prediction modes include, but are not limited to, DC, Planar, SMOOTH, SMOOTH_H, SMOOTH_V, Paeth, and Plane modes.

Embodiments (e.g. decoders) may perform the segmentation process in different ways. According to embodiments, the segmentation process may be performed on the current block (722). In one example, a threshold value of the samples within the single current block (722) is first calculated. According to the threshold, samples are classified into different segments by comparing their value with the threshold value. The threshold value includes, but is not limited to, the mean, median value, or other values that is derived from the mean or median value. In another example, a histogram of the distribution of values of the samples is calculated. According to the histogram, one or more threshold values on the sample counts are derived, and samples are classified into different segments by comparing their sample count in the histogram and the threshold values. In another example, a convolutional neural network is applied using the samples of the current block (722) as an input, and the output of the convolutional neural network is a segment index for each sample. In another example, edge detection methods may be applied to the block. Segmentation may be done according to possible edge boundaries.

Figure 16:
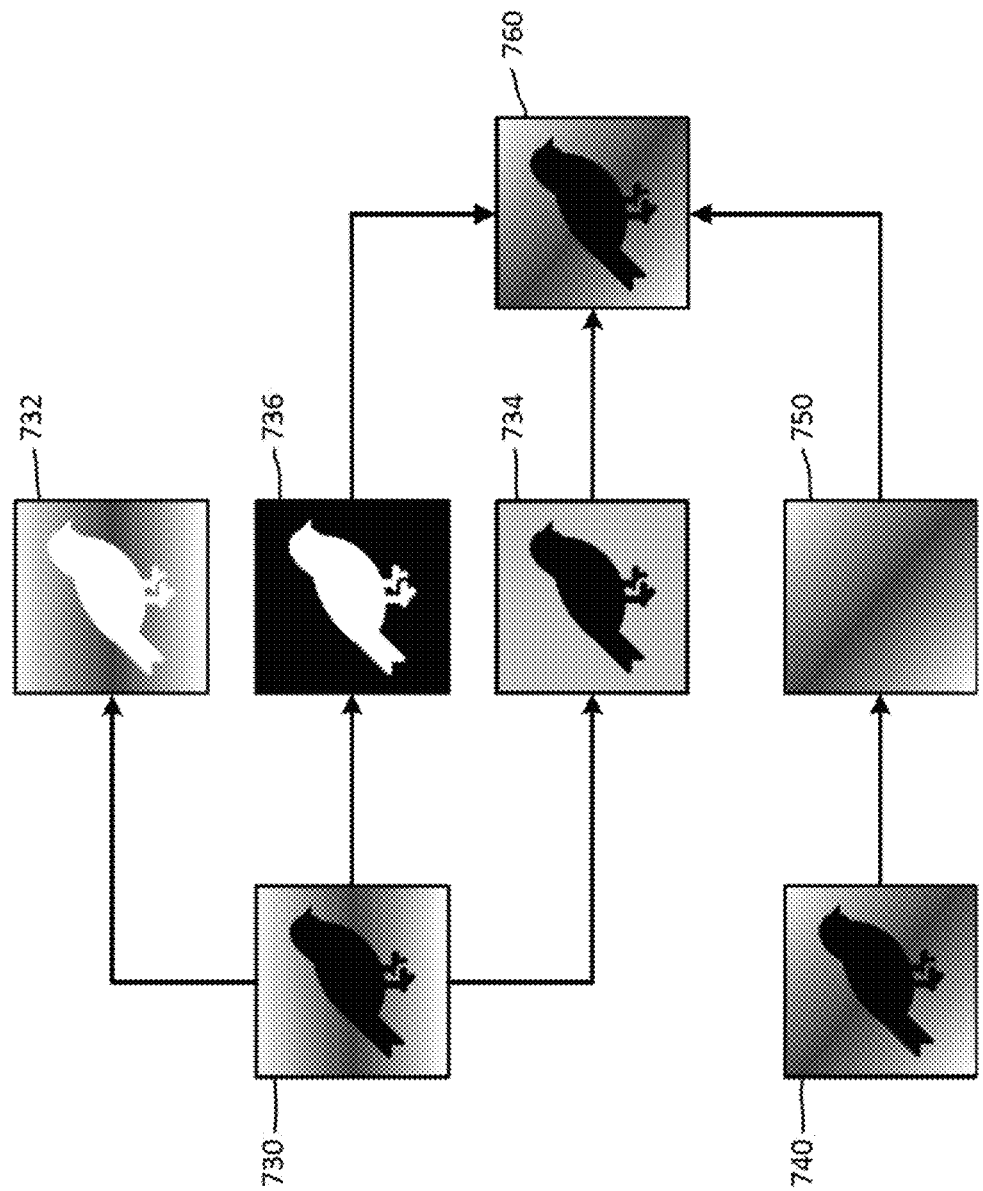
FIG. 16 is a diagram illustrating a process according to embodiments of the present disclosure.

According to one or more embodiments, with reference to FIG. 16, the segmentation is first applied on a reference block (730), then the segmentation information is further mapped to a current block (740) to derive the segmentation of the samples of the current block (740). In one example, a block vector is used to identify the reference block (730) in neighboring reconstructed areas, segmentation is applied on the reference block (730), and then the segmentation information is mapped to the current block (740) using the block vector. With reference to FIG. 16, the reference block (730) for the current block (740) is derived using a block vector within the same picture. Then, a segmentation process is applied on the reference block (730), and the reference block (730) is divided into, for example, multiple parts (e.g. a first segment (732) and a second segment (734)). In the example shown in FIG. 16, the first segment (732) includes areas outside an image of a bird, and the second segment (734) includes the image of the bird. In the segmentation process, a segmentation map (736) is obtained that indicates the segment index for each sample. With reference to FIG. 16, the black portion of the segmentation map (736) corresponds to the first segment (732), and the white portion of the segmentation map (736) corresponds to the second segment (734). Then, the segmentation map (736) is mapped to the current block (740) using the block vector to derive the segmentation information of the current block (740). Based on the segmentation information, the current block (740) is segmented into multiple segments (e.g. two segments corresponding to the first segment (732) and the second segment (734)). For example, a first segment of the current block (740) includes areas outside an image of a bird, and a second segment of the current block (740) includes the image of the bird. Then, a conventional prediction process is applied for the current block (740) to derive a conventional prediction block (750). For example, the conventional prediction process may applied for the first segment of the current block (740), which includes areas outside the image of the bird, and not the second segment of the current block (740). Finally, the conventional prediction block (750) and the second segment (734), from the reference block (730), are combined using the segmentation map (736) to derive a combined prediction block (760).

For each segment, prediction samples may be generated within the segment boundary. After predicting samples of each possible segment, predicted segments may be merged together to form a final predictor of the current block (740). This prediction block, together with possible decoded residue block signal, can form the reconstructed block (before any loop filtering) by adding the two together.

According to embodiments, the identifying the reference block (730), the predicting using the second segment (734) of the reference block (730), and the combining of the second segment (734) with the conventional prediction block (750) may be considered as a part of a prediction mode other than the conventional prediction process used to obtain the combined prediction block (760).

B. Second Aspect

According to the examples described above with respect to the first aspect, block vector of intra block copy mode and intra prediction direction (or non-directional mode option) may need to be specified for the segmented prediction mode. Non-limiting example processes of the selection that may be performed (e.g. by a decoder) are described below.

In one embodiment, a block vector of IBC mode is signaled to indicate the reference block location. The signaling can be based on vector prediction and a coded difference. The coded difference may be a difference between the block vector and its predictor, and may be received by the decoder from the encoder.

In another embodiment, a block vector candidate list is obtained, and one candidate is chosen from the list by signaling the index of an entry in the list. The chosen candidate is used as the block vector without a difference being coded.

In another embodiment, a block vector candidate list is obtained, and one candidate is chosen from the list by selecting a default entry position in the list. For example, a decoder may choose the first entry in the list as the default entry position. In this case, no index may need to be signaled. The chosen candidate is used as the block vector without a difference being coded.

In another embodiment, an intra mode is signaled to indicate the intra prediction method for one of the segments. The signaling can be based on a separate set of intra prediction modes. In one example, regular intra prediction may have M prediction modes while the separate set of intra prediction modes may be N modes. N may not be equal to M. A Most Probable Mode (MPM) list may be obtained to predict the selected intra mode. In one example, the N intra prediction modes can be a subset of the full set of M regular intra prediction modes.

In another embodiment, an intra prediction mode candidate list is obtained, and one candidate is chosen from the list by signaling an index of an entry in the list. The chosen candidate is used as the intra prediction mode without a difference being coded.

In another embodiment, an intra prediction mode candidate list is obtained, and one candidate is chosen from the list by selecting a default entry position in the list. For example, a decoder may choose the first entry in the list as the default entry position. In this case, no index may need to be signaled. The chosen candidate is used as the intra prediction mode without a difference being coded.

Figure 17:
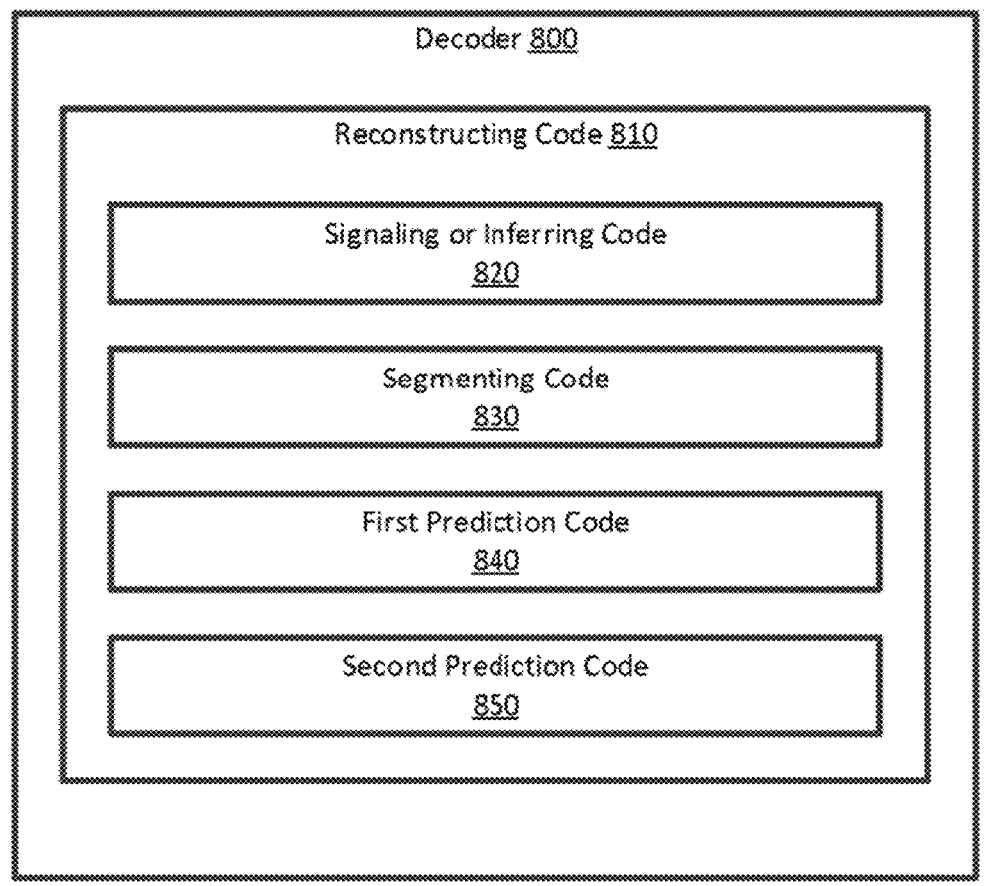
FIG. 17 is a schematic diagram of a decoder according to an embodiment of the present disclosure.

According to embodiments, at least one processor and memory storing computer program instructions may be provided. The computer program instructions, when executed by the at least one processor, may implement an encoder or a decoder and may perform any number of the functions described in the present disclosure. For example, with reference to FIG. 17, the at least one processor may implement a decoder (800). The computer program instructions may include, for example, reconstructing code (810) that is configured to cause the at least one processor to reconstruct a current block of a coded picture that is received (e.g. from an encoder). The reconstructing code (810) may include, for example, signaling or inferring code (820), segmenting code (830), first prediction code (840), and/or second prediction code (850).

The signaling or inferring code (820) may be configured to cause the at least one processor to signal values of syntax elements (e.g. flags, indexes, etc.), in accordance with embodiments of the present disclosure, which may be received by the decoder 800 from an encoder or otherwise obtained. Alternatively or additionally, signaling or inferring code (820) may be configured to cause the at least one processor to infer information (e.g. default intra prediction modes and/or mode information related to IBC), in accordance with embodiments of the present disclosure.

The segmenting code (830) may include current block segmenting code that is configured to cause the at least one processor to segment samples of the current block into a plurality of segments including a first segment and a second segment, in accordance with embodiments of the present disclosure. For example, the current block segmenting code may be configured to cause the at least one processor to calculate at least one threshold value based on the samples of the current block, and segment the samples of the current block based on the at least one threshold value. In such case and other cases, the segmenting of the samples of the current block may be performed before applying a first prediction mode. Alternatively, with reference to descriptions of FIG. 16, the current block segmenting code may be configured to cause the at least one processor to segment the samples of the current block by mapping segmentation information (e.g. a segmentation map) of a reference block that is obtained to the current block. In such case, the segmenting code (830) may further include reference block segmenting code that is configured to cause the at least one processor to segment samples of the reference block of the coded picture into a plurality of segments such as to obtain the segmentation information of the reference block. In such case and other cases, the segmenting of samples may be performed concurrently, at least in part, with the applying of the first prediction mode.

The first prediction code (840) may be configured to cause the at least one processor to apply the first prediction mode for prediction of the first segment of the current block of the coded picture, in accordance with embodiments of the present disclosure. According to embodiments, the first prediction mode may be the IBC mode. According to embodiments with reference to FIG. 16, the first prediction code (840) may be configured to cause the at least one processor to identify, before the segmenting the samples of the reference block and before the segmenting the samples of the current block, the reference block based on a block vector. In such case, the first prediction code (840) may be configured to cause the at least one processor to obtain a combined prediction block by combining, using the segmentation information, a prediction block of the current block with a segment of the reference block that corresponds to the first segment of the current block.

The second prediction code (850) may be configured to cause the at least one processor to apply a second prediction mode, different from the first prediction mode, for prediction of the second segment of the current block of the coded picture. According to embodiments, the second prediction mode may an intra prediction mode that uses neighboring reconstructed samples to perform intra prediction. According to embodiments with reference to FIG. 16, the second prediction code (850) may be configured to cause the at least one processor to obtain the prediction block that predicts the second segment of the current block, wherein the prediction block is used to obtain the combined prediction block.

According to embodiments, the encoder-side processes corresponding to the above processes may be implemented by encoding code for encoding a picture as would be understood by a person of ordinary skill in the art, based on the above descriptions.

The techniques of embodiments of the present disclosure described above, can be implemented as computer software using computer-readable instructions and physically stored in one or more computer-readable media. For example, FIG. 18 shows a computer system (900) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 18 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices). For example, such devices may be audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system 900 by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter (950) may be included in the core (940).

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hard-wired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor, the method comprising:
   receiving a coded picture; and
   reconstructing a current block of the coded picture, the reconstructing comprising:
      segmenting samples within the current block into a plurality of segments including a first segment and a second segment;
      predicting the first segment of the current block of the coded picture by using a first prediction mode that is an intra block copy (IBC) mode; and
      predicting the second segment of the current block of the coded picture by using a second prediction mode, different from the first prediction mode, that is an intra prediction mode that uses neighboring reconstructed samples to perform intra prediction.

2. The method of claim 1, wherein the reconstructing the current block further comprises signaling the first prediction mode.

3. The method of claim 1, wherein the reconstructing the current block comprises signaling the second prediction mode.

4. The method of claim 1, wherein the segmenting comprises:
   calculating at least one threshold value based on the samples within the current block; and
   segmenting the samples within the current block based on the at least one threshold value.

5. The method of claim 1, wherein
   the reconstructing the current block further comprises segmenting samples within a reference block of the coded picture into a plurality of segments such as to obtain segmentation information of the reference block, and
   the segmenting the samples within the current block comprises mapping the segmentation information of the reference block to the current block.

6. The method of claim 5, wherein
   the predicting the first segment of the current block comprises identifying, before the segmenting the samples within the reference block and before the segmenting the samples within the current block, the reference block based on a block vector, and
   wherein the mapping comprises mapping the segmentation information of the reference block to the current block based on the block vector.

7. The method of claim 6, wherein
   the predicting the second segment of the current block comprises obtaining a prediction block that predicts the second segment of the current block, and the predicting the first segment of the current block further comprises obtaining a combined prediction block by combining, using the segmentation information, the prediction block of the current block with a segment of the reference block that corresponds to the first segment of the current block.

8. The method of claim 7, wherein the segmentation information is a segmentation map.

9. The method of claim 1, wherein the segmenting the samples within the current block is performed before the predicting the first segment.

10. A system comprising:
at least one memory configured to store computer program code; and
at least one processor configured to access the computer program code and operate as instructed by the computer program code, the computer program code comprising:
reconstructing code configured to cause the at least one processor to reconstruct a current block of a coded picture that is received, the reconstructing code comprising:
current block segmenting code configured to cause the at least one processor to segment samples within the current block into a plurality of segments including a first segment and a second segment;
first prediction code configured to cause the at least one processor to predict the first segment of the current block of the coded picture by using a first prediction mode that is an intra block copy (IBC) mode; and
second prediction code configured to cause the at least one processor to predict the second segment of the current block of the coded picture by using a second prediction mode, different from the first prediction mode, that is an intra prediction mode that uses neighboring reconstructed samples to perform intra prediction.

11. The system of claim 10, wherein the reconstructing code further comprises signaling code that is configured to cause the at least one processor to signal the first prediction mode.

12. The system of claim 10, wherein the reconstructing code further comprises signaling code that is configured to cause the at least one processor to signal the second prediction mode.

13. The system of claim 10, wherein the current block segmenting code is further configured to cause the at least one processor to:
calculate at least one threshold value based on the samples within the current block; and
segment the samples within the current block based on the at least one threshold value.

14. The system of claim 10, wherein
the reconstructing code further comprises reference block segmenting code that is configured to cause the at least one processor to segment samples within a reference block of the coded picture into a plurality of segments such as to obtain segmentation information of the reference block, and
the current block segmenting code is configured to cause the at least one processor to map the segmentation information of the reference block to the current block.

15. The system of claim 14, wherein
the first prediction code is configured to cause the at least one processor to identify, before the samples within the reference block and the samples within the current block are segmented by the at least one processor, the reference block based on a block vector, and
the current block segmenting code is configured to cause the at least one processor to map the segmentation information of the reference block to the current block based on the block vector.

16. The system of claim 15, wherein
the second prediction code is configured to cause the at least one processor to obtain a prediction block that predicts the second segment of the current block, and
the first prediction code is configured to cause the at least one processor to obtain a combined prediction block by combining, using the segmentation information, the prediction block of the current block with a segment of the reference block that corresponds to the first segment of the current block.

17. The system of claim 16, wherein the segmentation information is a segmentation map.

18. A non-transitory computer-readable medium storing computer instructions that are configured to, when executed by at least one processor, cause the at least one processor to:
reconstruct a current block of a coded picture that is received by:
segmenting samples within the current block into a plurality of segments including a first segment and a second segment;
predict the first segment of the current block of the coded picture by using a first prediction mode that is an intra block copy (IBC) mode; and
predict the second segment of the current block of the coded picture by using a second prediction mode, different from the first prediction mode, that is an intra prediction mode that uses neighboring reconstructed samples to perform intra prediction.

* * * * *